Dec. 17, 1963 W. G. PODBIELNIAK 3,114,706
CENTRIFUGAL COUNTERCURRENT EXCHANGE DEVICE
WITH INTERCHANGEABLE DISC COLUMNS
Filed Nov. 1, 1961 5 Sheets-Sheet 1

FIG. 1

INVENTOR.
WLADZIA G. PODBIELNIAK
BY
Silverman, Mullin & Cass
ATT'YS.

Dec. 17, 1963 W. G. PODBIELNIAK 3,114,706
CENTRIFUGAL COUNTERCURRENT EXCHANGE DEVICE
WITH INTERCHANGEABLE DISC COLUMNS
Filed Nov. 1, 1961 5 Sheets-Sheet 3

*INVENTOR.*
WLADZIA G. PODBIELNIAK
BY
*Silverman, Mullin & Cass*
ATT'YS.

Dec. 17, 1963     W. G. PODBIELNIAK     3,114,706
CENTRIFUGAL COUNTERCURRENT EXCHANGE DEVICE
WITH INTERCHANGEABLE DISC COLUMNS Filed Nov. 1, 1961     5 Sheets—Sheet 5

INVENTOR.
WLADZIA G. PODBIELNIAK
BY
*Silverman, Mulling Cass*
ATT'YS.

3,114,706
CENTRIFUGAL COUNTERCURRENT EXCHANGE DEVICE WITH INTERCHANGEABLE DISC COLUMNS
Wladzia G. Podbielniak, 632 N. Dearborn St., Chicago, Ill.
Filed Nov. 1, 1961, Ser. No. 149,425
12 Claims. (Cl. 233—15)

This invention relates generally to centrifugal countercurrent exchange or contacting devices of the type disclosed in United States Patent No. 2,670,132 and in the co-pending application of Collin M. Doyle, entitled Rotating Column Contact Device, Serial No. 27,651, filed May 9, 1960. More particularly, the invention relates to improvements in such devices which enable a single standardized device or machine to be readily adapted for substantially universal use under all conditions of operation.

Centrifugal exchange or contacting devices of the type under consideration have, in recent years, become increasingly important so that they now enjoy relatively widespread usage in a great variety of industrial and experimental processes. A mere partial list of the numerous applications of the devices includes: desalination of water, vapor liquid contacting such as vegetable oils with steam, antibiotics, petroleum with phenol and hexane dewaxing, extraction of phenol from waste coke oven liquors, extraction of gum from vegetable oils, caustic and acid refining or treatment of vegetable oils and petroleum oils and products, including petro-chemicals, solvent extraction such as the "Duo-Sol" process for refining lubricating oils to increase the viscosity index, solvent extraction of lubricating oil with furfural, furfural refining of vegetable oils, decaffeination of coffee, uranium, rare earth metals, waste sulphite liquors, solvent fractionating, plastics, acids, inks, wines, breweries, coal tar derivatives, contaminated oils, dairy products, drug extracts, dyes, essential oils, fats and glycerin, fish oil, fruit juices, germicides and insecticides, hormones and vitamins, lacquers and drying oils, latex, nut and seed oils, paint and varnish, pharmaceuticals, plastics, soaps, solvents, sulfonates, synthetic detergents, yeast separations, etc. Actually, they may be advantageously employed in any operation where it is necessary or desirable to bring two fluids into contact for the purpose of separating or extracting a component from one of said fluids.

Although numerous machines of the type under consideration have heretofore been suggested and/or provided, a plurality of disadvantageous features has militated against even greater and more universal use thereof. In general, the prior machines comprised a plurality of perforated bands positioned in spaced concentric relationship within a sealed rotor. Means were provided for admitting a heavier fluid into the rotor at or near the center thereof and for removing the same from the rotor at or near the periphery thereof. Means likewise were provided for admitting a lighter fluid under pressure into the rotor at or near the periphery thereof and for removing the same from the rotor at or near the center thereof.

Due to the centrifugal forces set up in the rotating rotor, the heavier fluid was caused to travel outwardly away from the rotor's center. The two fluids thus travelled in opposite directions (countercurrent) through the rotor although their physical path of travel was substantially co-current. During the course of these opposing travels, the fluids were forced to pass through the perforations in the bands, whereupon they were dispersed and brought into intimate contact with each other to carry out the function of the particular process.

In some processes, three liquids are sometimes used, in which case the intermediate liquid is admitted to the rotor somewhere between the heavy liquid in and light liquid in, depending upon the characteristics of the process. Thus, for example, in the phenol refining of lubricating oil, water is sometimes injected as an intermediate liquid to assist in the "spring" of the extraction. It is discharged in the phenol along with the products extracted from the lubricating oil.

It may be said that there are two basic phenomena within a centrifugal exchange or contact device which are capable of control and variation. These phenomena may conveniently be referred to as "separating force" and "mixing energy." The separating force may be described as that force which tends to separate the two fluids after they have been intimately mixed through the various stages of the machine. This force results primarily from the pressure at which the lighter fluid is introduced into the rotor and the centrifugal force generated within the rotor. It is, of course, well known that the centrifugal force is proportional to the speed at which the rotor is rotating, and since the rotational speed is readily controllable by means of variable speed motors and the like, the problem of varying the separating force is not a difficult one.

However, the matter of varying or controlling the mixing energy presents a more complex and heretofore insoluble problem. Mixing energy may be described as all of the various conditions in the rotor which affect or tend to cause the two fluids or liquids to mix with each other. Thus, for example, it is known that the mixing energy will increase when the rate of flow or throughput of the two liquids is increased. Similarly, greater mixing energy is required when the volume ratio of the two liquids is greater, viz., 10 to 1 as compared to 1 to 1. It is, likewise, well known that the mixing energy is affected by the size, number and total area of the perforations in the concentric rotor bands. Thus, for example, greater mixing energy may be achieved by decreasing the size, number and total area of the perforations, and vice versa.

In order to obtain efficient intimate mixing of the two fluids within the rotor, it is essential that the fluids first be broken up or dispersed into small droplets for each mixing stage. Actually, the dispersal or "tearing up" of the fluids into small droplets for each mixing stage is the most important single requirement, since it not only enables the fluids to be more intimately mixed, but is also directly related to the mixing energy within the rotor. Thus, for example, if a device is designed to provide the proper mixing energy for a capacity or throughput of 100 gallons per minute, that device would not be suitable for a reduced throughput of 10 gallons per minute, because proportionately greater mixing energy is required. However, the required greater mixing energy could be provided by controlling the droplet dispersal and reducing the number, total area and/or size of the perforations in the cylindrical bands. Similarly, a machine designed for proper droplet dispersal of liquids of low specific gravity (such as penicillin filtered broth or beer and methyl ethyl ketone) would be completely unsuitable for the proper droplet dispersal of more viscous liquids (such as lubricating oil and phenol) because the dispersal perforations are too small in size. Again, where the two liquids of any particular process tend to emulsify, this can be overcome by varying the droplet dispersal characteristics to decrease the mixing energy within the rotor. The great importance of droplet dispersal control may thus be appreciated, yet suitable control means therefor have not been provided heretofor.

The number of factors which determine the mixing energy required for a particular process is dependent upon the physical and chemical characteristics of the liquid reactants involved, and is thus as variable and limitless as the possible number of applications for the exchange or contacting devices. Such factors might include viscosity, specific gravity, surface tension, immiscibility, ratio of one liquid to the other, emulsification, etc. It may thus be appreciated that the provision of means for varying or controlling the droplet dispersal and mixing energy within any specific contacting device is most desirable and of great importance to the art. In this regard, it is well to note that contacting devices of the type under consideration are extremely expensive and generally are made to order with fixed physical characteristics for a single specific process. Thus, for example, if a contacting device had been designed to operate efficiently for a specific process in, for example, the petroleum industry, the use of that device for a different process, even within the same industry, generally was impossible or impractical. This meant, of course, the purchase of another expensive contactor to carry out the second process. Obviously, the same limitations applied to devices designed for different industries.

It is, therefore, an important object of this invention to provide a centrifugal countercurrent exchange device having means for readily varying and controlling the mixing energy within that device.

Another important object of the invention is to provide a centrifugal countercurrent exchange device of the character described which, because the mixing energy therein may be readily varied, is universally applicable for all processes involving any two fluids. The dimensions and production of the device thus may be standardized to thereby eliminate the custom-made production which was heretofore necessary.

A further important object is to provide a centrifugal countercurrent exchange device of the character described having means for readily varying and controlling the droplet dispersal as required by the particular process being carried out.

Still another object is to afford a device of the character described having means for readily varying and controlling droplet dispersal in two planes—viz., rotary dispersal as well as radial dispersal.

The prevailing theory of operation of the devices in this art has heretofore been typified in the aforesaid Patent No. 2,670,132, i.e., that the mixing of the liquids in the rotor was caused by "jet action" resulting from the passage of the liquids at high speeds through tiny perforations in the bands, and that little, if any, mixing occurred in the areas between the bands. However, it has been determined, as more fully described in the aforementioned co-pending patent application, that this theory was erroneous, and that the mixing of the liquids took place primarily in the spaces between the bands. This being the case, the prior forms of construction, in which all of the bands customarily were performed, were inconsistent with the actual physical phenomena present in the rotor. Quite the contrary, it would now appear that the most efficient results are obtainable if the bands are imperforate, with only sufficient openings being provided to permit variation of the mixing energy through proper dispersal of the liquids or fluids into droplets and passage of the liquids from one stage to the next. Such construction affords greater efficiency by permitting more complete separation of the two fluids in each mixing stage.

It is, therefore, another object of the invention to provide a centrifugal countercurrent exchange device of the character described in which means are provided for readily varying the size, number and total area of the openings required to achieve a desired mixing energy. In this regard, the means comprises a novel column made up of a plurality of discs which may be equal in number to the number of concentric bands in the rotor, and insertable in a series of aligned holes in the bands to close the same.

A further object is to provide a centrifugal countercurrent exchange device of the character described in which a plurality of said disc columns are readily interchangeable so that any desired condition of droplet dispersal and mixing energy can be achieved.

Another object is to provide a centrifugal countercurrent exchange device of the character described in which said disc columns comprise a cage-like structure having a plurality of circumferentially arranged disc positioning and supporting racks whereby the insertion or removal of the columns into or from the holes in the bands may be readily made without any of the individual discs interfering with or impinging against the marginal edges of the concentric separator bands.

A further object is to afford a centrifugal countercurrent exchange device of the character described in which said disc columns may alternatively comprise a plurality of discs supported on a single central rod with suitably sized spacer elements positioned between the discs.

Yet a further object is to provide a centrifugal countercurrent exchange device of the character described in which a perforated sleeve is positioned in said aligned band holes, said disc columns being positioned in said sleeve.

Still another object is to afford a centrifugal countercurrent exchange device of the character described in which access to the interior of the rotor is readily achieved for purposes of cleaning or maintenance by merely removing said disc columns.

Yet another object is to provide a centrifugal countercurrent exchange device of the character described in which the rotor may be more sturdily made of integral construction.

Still a further object is to afford a centrifugal countercurrent exchange device of the character described which may be relatively inexpensively fabricated and yet is most efficient and durable for the purposes intended.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating and understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIGS. 5 and 14 are end elevational views of two other possible forms of discs;

Figure 1:
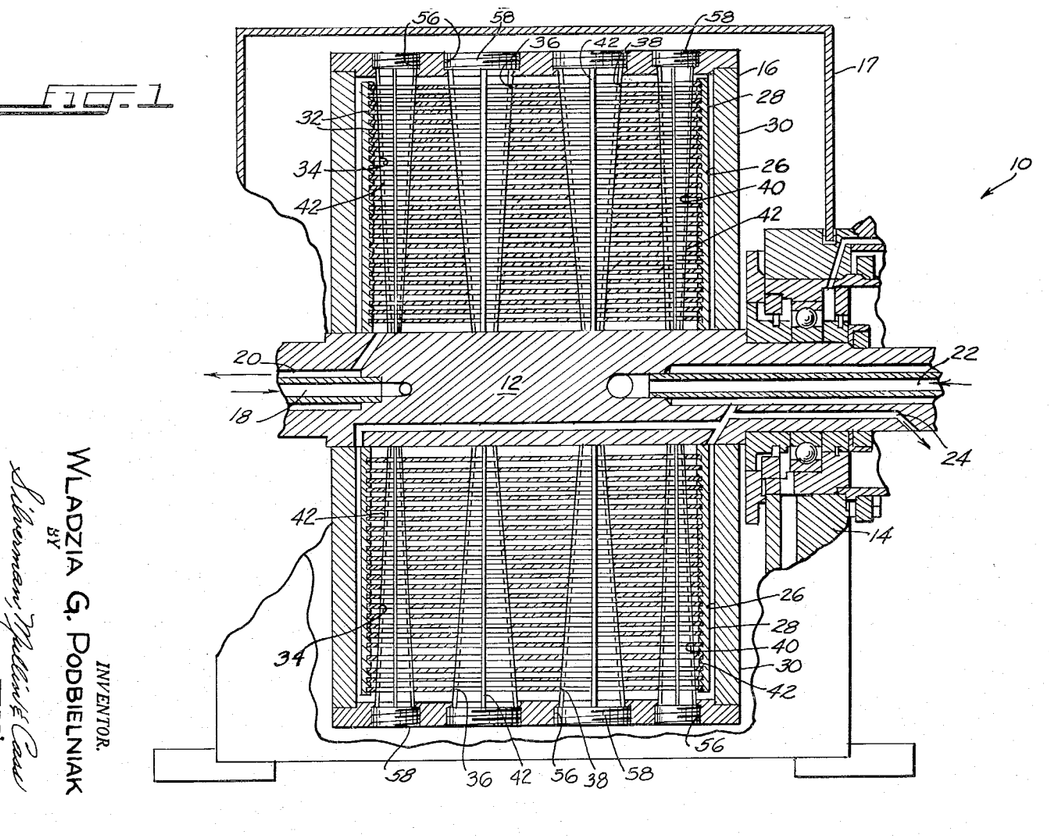
FIG. 1 is a fragmentary vertical sectional view of a centrifugal countercurrent exchange device with interchangeable disc columns embodying the principles of the invention.

Turning now to FIG. 1 of the drawings, the reference numeral 10 indicates generally a centrifugal countercurrent exchange device embodying the principles of the invention. Since the basic device 10 is generally of the type described in the aforementioned co-pending application and prior patent and does not in and of itself comprise a part of the subject invention, only so much thereof as is necessary for an understanding of the subject invention will be described. The device 10 thus comprises a shaft 12 suitably journalled for rotation in a supporting structure 14. A drum or rotor 16 is rigidly connected to the shaft 12 for rotation therewith, and the entire device may be enclosed by a removable protective cover such as 17.

Suitable passageways such as 18 and 20 are provided in the shaft 12 for respectively supplying the heavier liquid to the central area of the drum 16 and removing the lighter liquid therefrom. Similarly, suitable passageways such as 22 and 24 are provided for respectively supplying the lighter liquid under pressure to the peripheral area of the drum 16 and removing the heavier liquid therefrom. Communicating with the passageway 24 for removing the heavier liquid may be passageways 26 provided between the spill-over discs 28 and end plates 30 of the drum 16.

A plurality of concentric cylindrical separator bands 32 is mounted in the spill-over discs 28 as indicated. It is important to note that the separator bands 32 are completely imperforate over their entire areas save for a plurality of series of aligned disc column holes such as 34, 36, 38 and 40, whose function subsequently will be described. This construction of the separator bands 32 differs radically from the prior art structures in which the bands invariably were perforated over all, or substantially all, of their areas. The imperforate bands 32 are important because they permit efficient and substantially complete separation of the two fluids after each mixing stage since the separated fluids are caused to coalesce thereagainst by the separating forces in the drum. The heavier fluid coalesces on the inner surfaces of the bands and the lighter fluid on the outer surfaces of the bands. Of course, such coalescence and substantially complete separation in each stage was not possible in the prior art devices having perforated bands.

As described in the aforementioned co-pending application, the spacing between the separator bands 32 preferably should increase with increasing radius, or at least be uniform, in order to most efficiently utilize the gravitational separating forces set up within the drum. If desired, however, te spacing between the bands may also be made to decrease with increasing radius.

Figure 2:
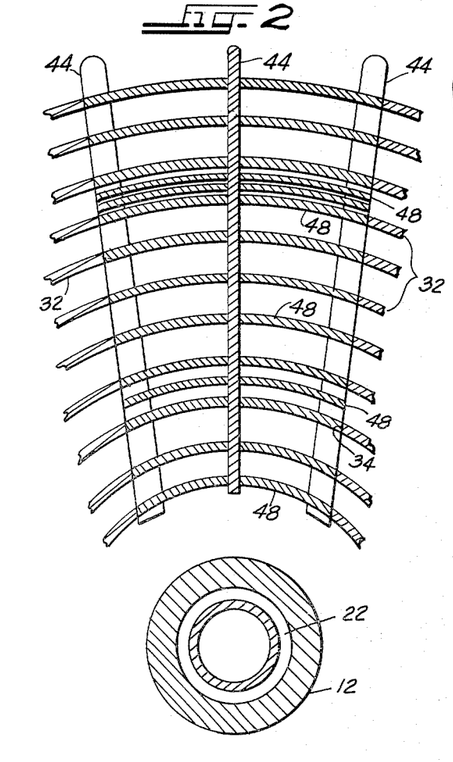
FIG. 2 is an enlarged fragmentary sectional view of a portion of the rotor showing a disc column positioned therein.
Figure 3:
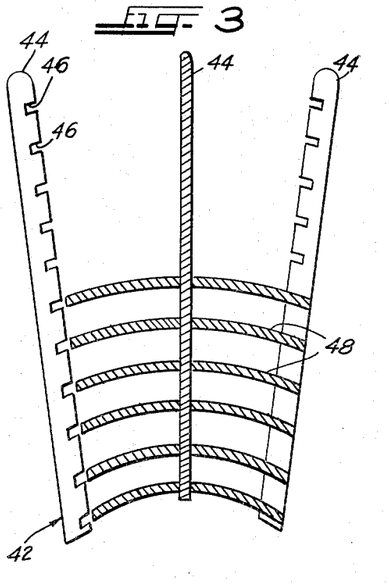
FIG. 3 is a similar view of the disc column alone with several of the discs removed therefrom to illustrate certain details of construction.
Figure 4:
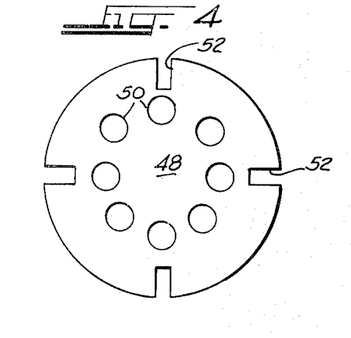
FIG. 4 is a plan view of one of the discs making up the disc column.
Figure 5:
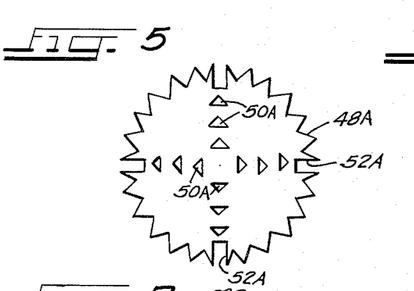
FIGS. 5 through 12 are plan views showing various discs with typical perforation arrangements.
Figure 6:
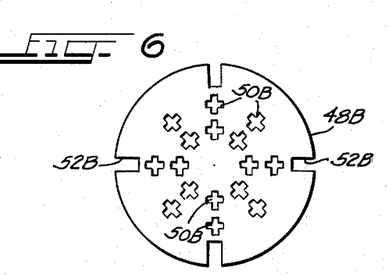
Figure 7:
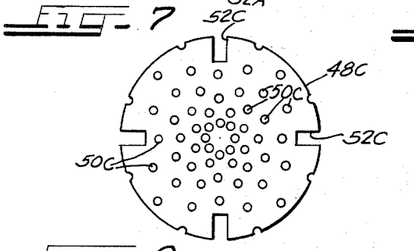
Figure 8:
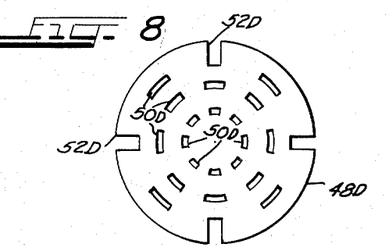
Figure 9:
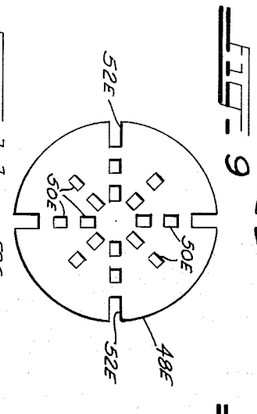
Figure 10:
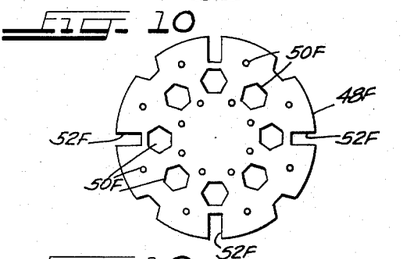
Figure 11:
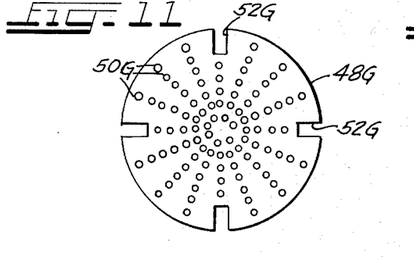
Figure 12:
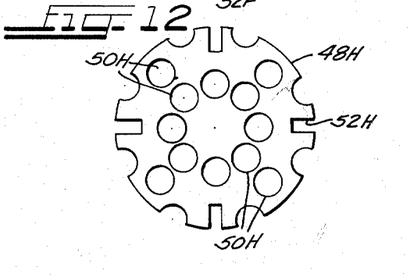

Removably positioned within each series of aligned holes 34, 36, 38 and 40, is a novel disc column indicated generally by the numeral 42, and which will be described in detail, with reference being had to FIGS. 2, 3 and 4 of the drawings. The disc column 42 comprises a plurality of disc supporting and positioning racks 44. Each of the racks 44 is provided with a plurality of spaced positioning notches 46. The number of notches 46 may be equal to or greater than the number of separator bands 32 so that at least one of said notches is in aligned relationship with each separator band when the disc column is operationally positioned in the drum (see FIG. 2). It will also be noted that the notches 46 are of varying pitch to correspond with the degree of curvature of the particular band with which the same is operationally aligned.

A plurality of discs 48 is removably supported by the racks 44, as indicated. Each of the discs 48 may be provided with perforations such as 50, and it will be seen that the same is likewise provided with a plurality of peripheral notches 52 adapted to cooperate with the notches 46 of the racks 44. It is important to note, however, that the notches 46 and 52 are dimensioned so that the outer edges of the racks 44 are in accurate alignment with the circumferential edges of the discs 48 in the operationally assembled disc column. The disc columns 42 thus may be readily inserted into, or removed from, a series of said aligned columnar holes such as 34 with the outer edges of the racks 44 functioning as guideways to prevent the marginal edges of the discs 48 from interfering with, or impinging against, the marginal edges of the bands 32. At the same time, it will be noted that each of the discs 48 is dimensioned and shaped to comprise, in effect, a circular cut-out from the particular band 32 with which the same is aligned. All of the holes in the aligned series 34, 36, 38 or 40 are thus accurately filled by a corresponding disc 48.

While the disc column 42 has been illustrated as comprising four racks 44, it should be understood that the same may likewise comprise any number of racks. In any event, the discs 48 will be provided with a number of peripheral notches 52 corresponding to the number of racks 44 employed.

The remarkable effect of the novel disc column 42 in rendering a given countercurrent exchange device completely universal for all conditions of operation may now be appreciated. By the simple expedient of interchanging the columns 42, virtually any condition of droplet dispersal and mixing energy readily may be achieved. Thus, for example, the disc 48 of FIG. 4 is shown as having circular perforations 50 of a specific dimension and overall area. It will be understood, however, that the discs 48 may likewise be made with other perforations of any desired shape, dimension, pattern and overall area to suit any particular operational requirement. Thus, for example, FIGS. 5 through 12 of the drawings illustrate eight (8) different discs 48A through 48H respectively which are merely representative of the limitless design possibilities for said discs.

Figure 13:
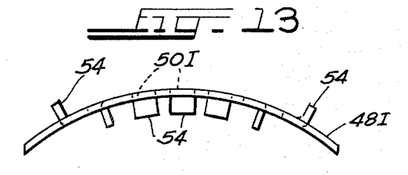

In FIG. 13 of the drawings is illustrated a similar disc 48I having perforations 50I therethrough. It will be noted, however, that the disc 48I is likewise provided with projections or tynes 54 projecting from both sides thereof and which may be struck therefrom so that they border on the perforations 50I. The tynes 54 assist in tearing or ripping the theretofore solid mass of liquid and thereby increase even further the efficiency of the all important droplet dispersal function.

Figure 14:
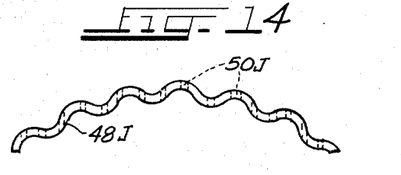
Figure 15:
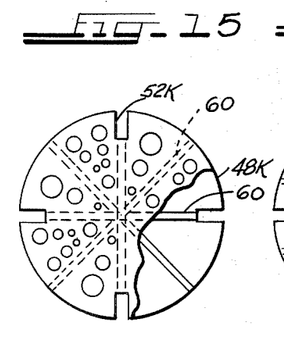
FIGS. 15 through 17 are plan views of typical discs showing in dotted outline vertical or rotary droplet dispersers in association therewith.
Figure 16:
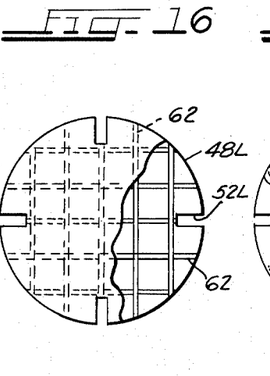
Figure 17:
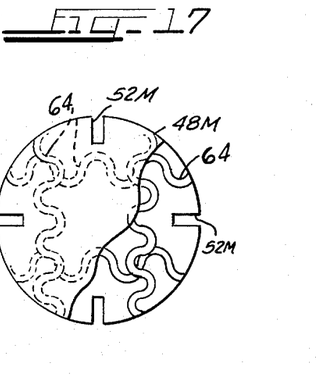
Figure 18:
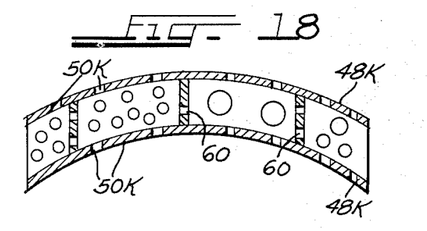
FIGS. 18 through 20 are vertical sectional views of the discs of FIGS. 15 through 17 respectively.
Figure 19:
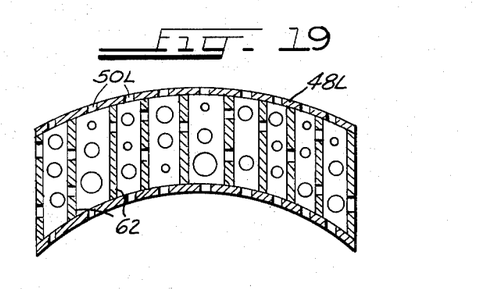
Figure 20:
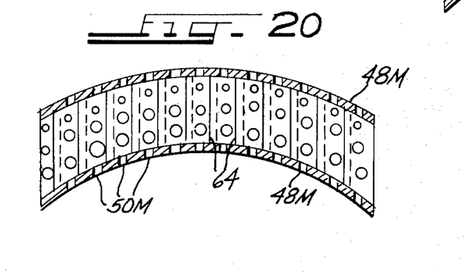

Still another possible type of disc is illustrated in FIG. 14 of the drawings wherein it will be seen that the disc 48J is made in rippled or wave-like form. The rippled disc 48J likewise aids the droplet dispersal function by serving to tear the mass of liquids, thereby dispersing the same into droplets, as the same is passing thereover or therethrough.

It should, of course, likewise be appreciated that the discs 48 may, if desired, be imperforate so that they completely seal off the series of holes 34, 36, 38 or 40 in which they are operationally positioned. In any event, it is merely necessary to operationally arrange the disc columns 42 in exact radially opposed pairs in order to maintain the required delicate balance of the centrifugal rotor 16. In this regard, it should be noted that while the device 10 has been shown as having only eight series of disc column holes 34, 36, 38 and 40, the device may have any even number of such series of aligned holes, so long as the same are radially opposed as described hereinabove.

For purposes of operationally retaining the disc columns 42 and permitting the insertion into or removal from the rotor 16 of said columns, the cylindrical outer wall of the rotor is provided with a plurality of circular port holes 56, one in alignment with each series of aligned disc column holes 34, 36, 38 and 40. A plug 58, which may be screw threaded as indicated, is removably positioned within each of the portholes 56, and the same bears against the top surfaces of the racks 44 to operationally retain the disc columns 42 within the rotor (see FIGS. 1 and 2). As an alternative, the plug 58 may be provided with an adjusting screw (not shown) which screw may then be adjusted until it bears with the proper tension against the outermost disc 48 of the particular disc column. The removal of a plug 58 and its associated disc column 42 likewise affords ready access to the interior of the rotor for purposes of cleaning or maintenance.

In the embodiment illustrated and described, the series of aligned disc column holes 34, 36, 38 and 40 have been shown as describing a tapering cavity in which the respective holes increase in diameter in each band from the center to the periphery of the rotor 16. Since the columns 42 are constructed with the identical taper, it may thus be appreciated that no anchoring means are required at the inner end of the columns to operationally retain the same. Where it is desired that the holes in each series of aligned holes be of uniform dimension (i.e., to thereby define a cylindrical cavity), inner anchoring means may be provided, as will be subsequently revealed as the description proceeds with relation to a second embodiment of the invention.

Referring now to FIGS. 15 through 20 of the drawings, still a further refinement for control of the droplet dispersal function is there illustrated. In these figures, typical discs such as 48K, 48L and 48M are shown as being interconnected by vertical risers such as 60, 62 and 64 respectively. The vertical risers 60, 62 and 64 are perforated, and it will thus be appreciated that the same function to disperse the liquids into droplets as they pass therethrough. However, the droplet dispersal caused by the vertical risers may be considered as rotary dispersal as distinguished from the radial dispersal resulting from the perforated discs. The risers thus impart a second dimension to the droplet dispersal function. In the same connection, the racks 44 may themselves be made perforated and/or in vertically wave-like form to aid in the rotary dispersal of the liquids. It should, of course, be appreciated that the arrangements of the vertical risers shown in FIGS. 15 through 20 are merely representative and that other arrangements thereof may likewise be utilized.

Figure 21:
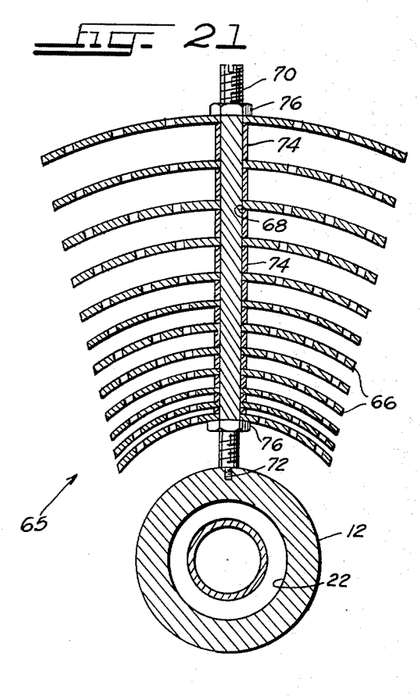
FIG. 21 is a sectional view of another form of disc column showing the manner in which the same is removably attached to the rotor shaft.

Another embodiment of the invention is illustrated in FIG. 21 wherein the disc column is indicated generally by the reference character 65. The disc column 65 comprises a plurality of vertically arranged discs 66 similar in all respects to the previously described discs 48. In this instance, however, each of the discs 66 is formed with a central opening 68 therethrough, and the peripheral notches 52 present in the discs 48 may be eliminated.

Positioned through the aligned openings 68 is a tie rod 70 having a threaded extension 72 at the inner end thereof. Cylindrical vertical spacers 74 are removably mounted on the tie rod 70, one between each adjacent pair of discs 66, and the same are suitably dimensioned so that all of the aligned holes 34, 36, 38 or 40 are closed by one of the discs in the manner already described. Lock nuts, such as 76, 76, may be utilized for completing the assembly of the column 65.

When a disc column 65 is operationally positioned in one of the series of aligned holes, the plug 58 will bear against the top of the tie rod 70 to retain the same in proper position. In addition, it will be noted that the threaded extension 72 is screwed into the device's drive shaft 12 into properly positioned threaded holes which have been drilled therein. The column 62 thus is securely anchored at both the inner and outer ends thereof.

Figure 22:
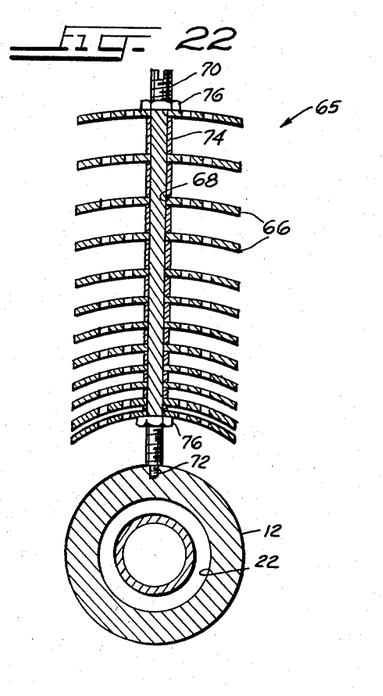
FIG. 22 is a similar view of a modified form of the disc column of FIG. 21.

In FIG. 22 of the drawings, the column 65 is illustrated as comprising discs 66 which are all of uniform dimension. Such a disc column, of course, may be utilized where the series of aligned holes 34, 36, 38 and 40 are of uniform dimension and describe a cylindrical cavity.

Figure 23:
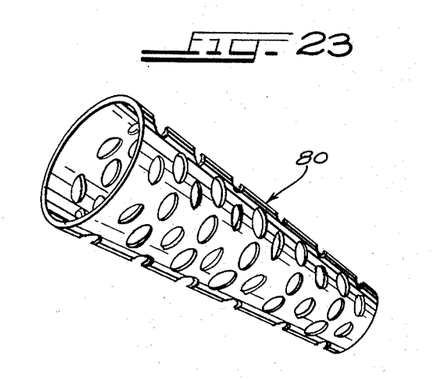
FIG. 23 is a perspective view of a perforated sleeve which may be used in conjunction with the disc columns.

A further refinement of the invention may comprise a heavily perforated sleeve 80 (see FIG. 23) which may be integral with the separator bands 32 or removable. The sleeve 80 is positioned within the series of aligned holes 34, 36, 38 and 40, and the same may be either tapered or cylindrical, depending upon the shape of the cavity defined by said holes. Where such sleeves are employed, the disc columns 42 or 65, of course, may be inserted thereinto instead of into the aligned holes themselves. It will be appreciated, however, that the perforated sleeves not only aid further in the rotary dispersion of the liquids but also eliminate the need for accurately spacing the discs since it is then no longer necessary that the discs be accurately aligned with the respective separator bands as previously described.

Another means may likewise be employed for eliminating the need for accurately spacing the discs. Instead of the discs 48 or 65 being arcuate to conform to the curvature of the particular separator band 32 with which the same is operationally aligned, the same may be made flat and of a greater thickness to compensate for the variations in curvature. If the discs are thick enough, they will accurately fill the aligned holes in the separator bands despite the fact that they are flat.

From the foregoing description and drawings, it should be apparent without further description that I have provided a centrifugal countercurrent exchange device having novel means for rendering the device virtually universal for substantially all processes of the type under consideration. The remarkable contribution to the art afforded by the novel disc columns 42 and 65 which may be readily interchanged to give unlimited precision control over the droplet dispersal and mixing energy are manifest. In this regard, it should be understood that although the disc columns have been described as being interchangeable, the individual discs on a single column may likewise be interchanged if desired. In addition, the novel disc columns permit the concentric separator bands to be made imperforate, thereby enabling a most efficient and substantially complete separation of the liquids in each mixing stage.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention, as defined in the appended claims.

What I claim and desire to secure by Letters Patent of the United States is:

1. In a centrifugal countercurrent exchange device including a rotor, a plurality of spaced concentric bands positioned in said rotor, said bands being formed with holes arranged to afford a plurality of radially extending cavities, and disc columns removably positioned in said cavities, each of said disc columns comprising a plurality of radially spaced discs arranged so that a disc is in radial alignment with each of said bands, means for removably retaining said discs in said columns and means for removably retaining said columns in said holes, said aligned discs completely filling said holes, each of said discs approximating a cut-out section from the band with which the same is aligned, at least some of said discs being formed with perforations therethrough and said discs and disc columns being interchangeable with other discs and disc columns whereby any desired condition of droplet dispersion my be obtained within said rotor.

2. The device of claim 1 in which said concentric bands are imperforate over their entire area except for said holes.

3. The device of claim 1 in which said discs are interconnected by vertical risers, said risers being perforated for rotary droplet dispersion of liquids passing through said rotor.

4. The device of claim 1 in which said discs are provided with tynes projecting from the top and bottom surfaces thereof, said tynes adapted to tear up and disperse liquids passing thereover.

5. The device of claim 1 in which said discs have wave-like top and bottom surfaces adapted to tear up and disperse liquids passing thereover.

6. The device of claim 1 in which said disc column comprises at least one elongated rack, said rack having a plurality of spaced positioning notches formed in the inner lateral edge thereof, said discs being removably supported in said positioning notches.

7. The device of claim 6 in which each of said discs is provided with a peripheral notch adapted to cooperate with said positioning notches whereby the marginal edge of said disc is in alignment with the outer lateral edge of said rack.

8. The device of claim 7 in which said rack is formed with perforations for rotary droplet dispersion of liquids passing through said rotor.

9. The device of claim 1 in which said disc column comprises a central rod, said rod being removably positioned through a central opening formed in each of said discs, and a cylindrical vertical spacer removably mounted on said rod between each adjacent pair of said discs.

10. The device of claim 9 in which a screw threaded projection is integrally formed on the inner end of said centrol rod, said projection adapted to be received in a screw threaded opening formed in the central shaft of said rotor.

11. A centrifugal countercurrent exchange device comprising a cylindrical rotor having an axial shaft, a plurality of radially spaced separator bands positioned in said rotor, said separator bands being imperforate over their entire area except for a plurality of circular holes formed therein and arranged to afford a plurality of radially extending cavities, a plurality of portholes formed in the outer cylindrical wall of said rotor, one in alignment with each of said cavities, a plug removably positioned in each of said portholes, and a disc column removably positioned in each of said cavities, said disc column comprising a plurality of perforated circular discs arranged in radially spaced relationship so that one of said discs is in radial alignment with each of said bands, means for removably retaining said discs in said columns and means for removably retaining said columns in said holes, each of said discs accurately filling the hole and comprising a section of the respective band with which the same is aligned, said discs and disc columns being interchangeable with other discs and disc columns whereby any desired condition of droplet dispersion may be obtained within said rotor.

12. A centrifugal countercurrent exchange device comprising a cylindrical rotor having an axial shaft, a plurality of radially spaced separator bands positioned in said rotor, said separator bands being imperforate over their entire area except for a plurality of circular holes formed therein and arranged to afford a plurality of radially extending cavities, a plurality of portholes formed in the outer cylindrical wall of said rotor, one in alignment with each of said cavities, a plug removably positioned in each of said portholes, a radially extending perforated sleeve positioned in each of said cavities and a disc column removably positioned in each of said sleeves, said disc column comprising a plurality of perforated circular discs arranged in radially spaced relationship so that one of said discs is in a radial alignment with each of said bands, means for removably retaining said discs in said columns, means for removably retaining said columns in said sleeve and said sleeves in said holes, each of said discs approximating a cut-out section from the band with which the same is aligned, said discs and disc columns being interchangeable with other discs and disc columns whereby any desired condition of droplet dispersion may be obtained in said rotor.

References Cited in the file of this patent

UNITED STATES PATENTS

| | | |
|---|---|---|
| 2,758,784 | Podbielniak et al. | Aug. 14, 1956 |
| 2,880,929 | Podbielniak | Apr. 7, 1959 |
| 3,013,780 | Wistrich | Dec. 19, 1961 |
| 3,050,238 | Doyle et al. | Aug. 21, 1962 |

FOREIGN PATENTS

| | | |
|---|---|---|
| 872,499 | Great Britain | July 12, 1961 |
| 1,227,578 | France | Aug. 22, 1960 |

UNITED STATES PATENT OFFICE
CERTIFICATE OF CORRECTION

Patent No. 3,114,706                          December 17, 1963

Wladzia G. Podbielniak

It is hereby certified that error appears in the above numbered patent requiring correction and that the said Letters Patent should read as corrected below.

In the grant (only), line 12, for "Wladzia G. Podbielniak, his heirs" read -- Wladzia G. Podbielniak, her heirs --; column 3, line 56, for "performed" read -- perforated --; column 4, line 51, for "and" read -- an --; column 5, line 1, for "5" read -- 13 --; line 63, for "te" read -- the --; column 8, line 9, for "dimensionand" read -- dimension and --.

Signed and sealed this 16th day of June 1964.

(SEAL)
Attest:

ERNEST W. SWIDER                        EDWARD J. BRENNER
Attesting Officer                           Commissioner of Patents